April 22, 1924.
S. W. SCHULTZ
DRY MASH HOPPER
Filed April 17, 1922
1,491,317
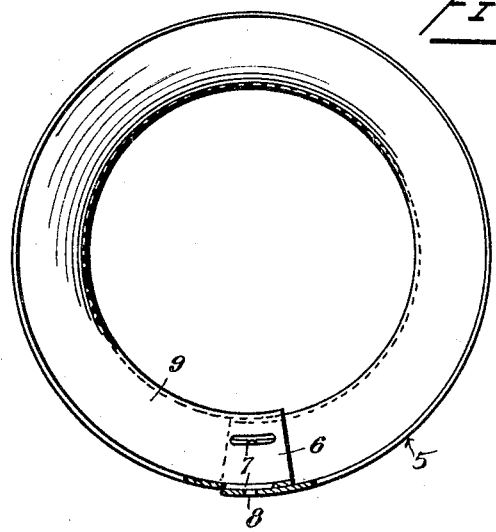
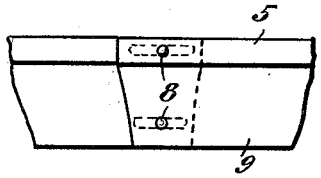
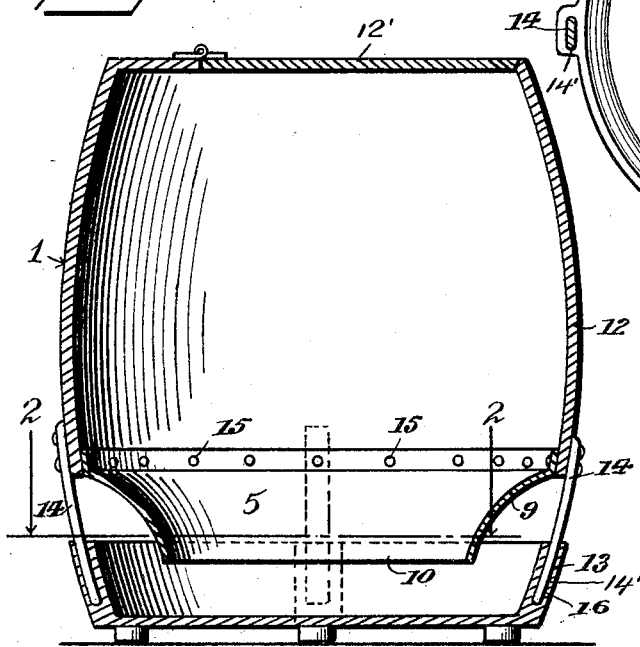
Inventor
S. W. Schultz
By William J. Jacolie
Attorney Patented Apr. 22, 1924.

1,491,317

UNITED STATES PATENT OFFICE.

SEBA W. SCHULTZ, OF GALENA, KANSAS.

DRY-MASH HOPPER.

Application filed April 17, 1922. Serial No. 553,459.

*To all whom it may concern:*

Be it known that SEBA W. SCHULTZ, a citizen of the United States, residing at Galena, in the county of Cherokee and State of Kansas, has invented certain new and useful Improvements in Dry-Mash Hoppers, of which the following is a specification.

My invention relates to improvements in feeding devices, particularly for fowl, such as chickens, and has for its primary object to provide a device of this character that will permit a container, preferably circular in shape to hold a large quantity of mash and to permit the mash to gravitate to the bottom of the container as the mash in the lower part of same is consumed by the fowl.

A further object of my invention is to provide a device of this character, that will enable a large number of chickens to feed from the container at the same time.

A still further object of my invention is to provide a device of this character, that will prevent the chicken or fowl from getting more than its head into the container holding the mash.

The present system of feeding fowl, such as scattering the feed over the ground results in a considerable loss of feed, especially is this true when fine meal or mash is used. Furthermore, the system of placing the feed in troughs and allowing the fowl to eat therefrom also has its disadvantages, as the fowl, such as chickens, crowd into the troughs and scatter the feed over the ground. With my improved feeding device, it is impossible for the chicken or chickens to reach the mash in the container except by sticking their heads through the opening provided in the sides of same, thus avoiding the loss of feed through scattering same over the ground.

And a still further object of my invention, is to provide a device of this character, that is simple in operation and construction, durable, efficient for the purpose intended and one that can be manufactured and placed on the market at a relatively low cost.

These and like objects will be better understood as the description proceeds, and as is specifically pointed out in the appended claim.

Referring to the accompanying drawing, which forms a part of this specification, Figure 1 is a transverse vertical section of a mash hopper and chicken feeder constructed in accordance with my invention.

Figure 2 is a transverse horizontal sectional view taken on line 2—2 of Fig. 1.

Fig. 3 is a detail top plan view of the regulating ring detached from the mash container, and Fig. 4 is a fragmentary detail view of the means for fastening the ends of the regulating ring.

In the drawing wherein for the purpose of illustration is shown the preferred embodiment of my invention, the numeral 1 designates generally a mash hopper constructed in approximately the shape of a barrel and comprises the upper and lower portions 12 and 13 respectively. It is to be understood that the device may be constructed of any suitable material such as wood, metal or the like, and I do not wish to limit myself to any particular kind of material. The upper portion 12 provides a circular feed container which has its bottom open while its top is provided with a hinged cover such as is shown at 12' in the drawing. This construction of the upper portion permits the mash or feed to be deposited therein through the top of the same whereby the feed will gravitate to the feed pan 13 in the manner as will be presently described.

The circular feed container 12 is supported in spaced relation on the feed pan 13 by means of the plates or brackets 14. The latter are secured at their upper ends to the outer walls of the container 12 preferably adjacent the open end thereof and are arranged in spaced relation with each other. As many of these brackets may be provided as is desirable or necessary. The free ends of the brackets are furthermore adapted to fit in suitable sockets 14' provided therefor and arranged on the feed pan 13 in the manner as clearly illustrated in Figs. 1 and 2 of the drawing.

Positioned within the container 12 and secured to the inner walls of the same at a point above the open end thereof, is a feed regulating ring designated generally by the numeral 5. The ends of this ring are adapted to overlap as indicated by the numeral 6 in the drawing, the one end of the ring being provided with slots 7 to receive the pins 8 carried by the opposite end of the ring, as is shown in Figs. 3 and 4 of the drawing. The feed regulating ring consists of a body portion 9 tapering inwardly to provide the reduced opening 10, through which the mash passes to the bottom of the container or the feed pan 13. The regulating ring is held in proper position within the container 12 by the fastening means 15. The inwardly tapering sides 9 of the regulating ring 5 not only provide a reduced mouth or opening for regulating the amount of feed gravitating into the feed pan, but also limit the extent to which a fowl may reach within the container.

It will thus be seen from the foregoing description, that the space between the container 12 and the feed pan 13 permits the fowl to obtain feed from the container, and as the mash within the feed pan is gradually consumed by the fowl, the mash in the upper part of the container above the regulating ring is gradually gravitated to the feed pan and replaces the mash which has been consumed. This thereby provides a means wherein the device will at all times supply a sufficient quantity of mash or feed to the fowl and will not necessitate having to continuously deposit a quantity of feed in a receptacle such as is now commonly done. Furthermore, with a device of the above mentioned character, a large number of fowl may be fed at one time and in such a manner as to render it impossible for the fowl to accidentally scatter the feed around on the ground for the reason that the regulating ring will only permit the head of the fowl to have access to the contents within the feed pan.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

What I claim as new and desire to secure by Letters Patent is:—

A poultry feeding device comprising a feeding pan provided with vertically arranged sockets, a feeding receptacle having its bottom open, brackets secured at their upper ends to the lower end of said receptacle and adapted to have their free ends fitting in said sockets for detachably supporting said receptacle on said pan in spaced relation thereto, and a feed regulating ring including an inwardly tapering body secured at its upper portion to the inner walls of said receptacle and adapted to extend into said pan.

In testimony whereof I affix my signature.

SEBA W. SCHULTZ.